United States Patent
Lee

(10) Patent No.: US 8,220,727 B2
(45) Date of Patent: Jul. 17, 2012

(54) PRESSURE-COMPENSATION DRIP TAPE

(75) Inventor: Chong Won Lee, Seoul (KR)

(73) Assignee: Seowon Co., Ltd, Bucheon-si (KR)

( * ) Notice: Subject to any disclaimer, the term of this patent is extended or adjusted under 35 U.S.C. 154(b) by 395 days.

(21) Appl. No.: 12/524,967

(22) PCT Filed: Feb. 20, 2008

(86) PCT No.: PCT/KR2008/000999
§ 371 (c)(1),
(2), (4) Date: Jul. 29, 2009

(87) PCT Pub. No.: WO2008/102983
PCT Pub. Date: Aug. 28, 2008

(65) Prior Publication Data
US 2010/0108785 A1    May 6, 2010

(30) Foreign Application Priority Data

Feb. 21, 2007  (KR) .................. 10-2007-0017345

(51) Int. Cl.
*B05B 15/00* (2006.01)

(52) U.S. Cl. .......... 239/542; 239/533.1; 239/547; 239/568; 138/42; 156/203

(58) Field of Classification Search .......... 239/145, 239/542, 547, 533.1, 548, 568; 138/42, 43; 156/203
See application file for complete search history.

(56) References Cited

U.S. PATENT DOCUMENTS

| | | | |
|---|---|---|---|
| 4,139,159 A * | 2/1979 | Inoue et al. | 239/547 |
| 4,534,515 A * | 8/1985 | Chapin | 239/542 |
| 4,548,360 A | 10/1985 | Delmer et al. | |
| 5,688,072 A * | 11/1997 | Meyer et al. | 239/542 |
| 5,785,785 A * | 7/1998 | Delmer et al. | 156/203 |

FOREIGN PATENT DOCUMENTS

| | | |
|---|---|---|
| KR | 20-1993-0005968 | 4/1993 |
| KR | 10-0204261 | 6/1999 |
| KR | 20-0172991 | 3/2000 |
| KR | 20-2000-0020541 | 12/2000 |
| KR | 20-0311839 | 5/2003 |
| KR | 10-0425605 | 9/2003 |
| KR | 20-0332247 | 11/2003 |
| KR | 20-0401878 | 11/2005 |
| KR | 20-0411174 | 3/2006 |
| KR | 10-0569225 | 4/2006 |
| KR | 20-1999-0017411 | 7/2009 |
| KR | 20-0306616 | 7/2009 |

* cited by examiner

*Primary Examiner* — Steven J Ganey
(74) *Attorney, Agent, or Firm* — Schmeiser, Olsen & Watts LLP

(57) ABSTRACT

The present invention provides a pressure-compensation drip tape, which is used in drip irrigation to continuously and evenly supply a small amount of water to plants. The drip tape of the present invention includes an outer shell 10, and overlapping sheets 21, 23 and 25, which are expandable depending on an increase of water pressure. Furthermore, the drip tape has a main passage 11, which is defined by the outer shell and the innermost overlapping sheet, such that most water supplied from a water source flows through the main passage, pressure-reducing passages 31 and 33, which are defined between the overlapping sheets, and discharge holes 21H, 23H and 25H, which are formed in the border between the main passage and one of the pressure-reducing passages and the border between the pressure-reducing passages, such that the water sequentially flows via the main passage and the pressure-reducing passages and drips outside the drip tape.

11 Claims, 2 Drawing Sheets

[Figure 1]
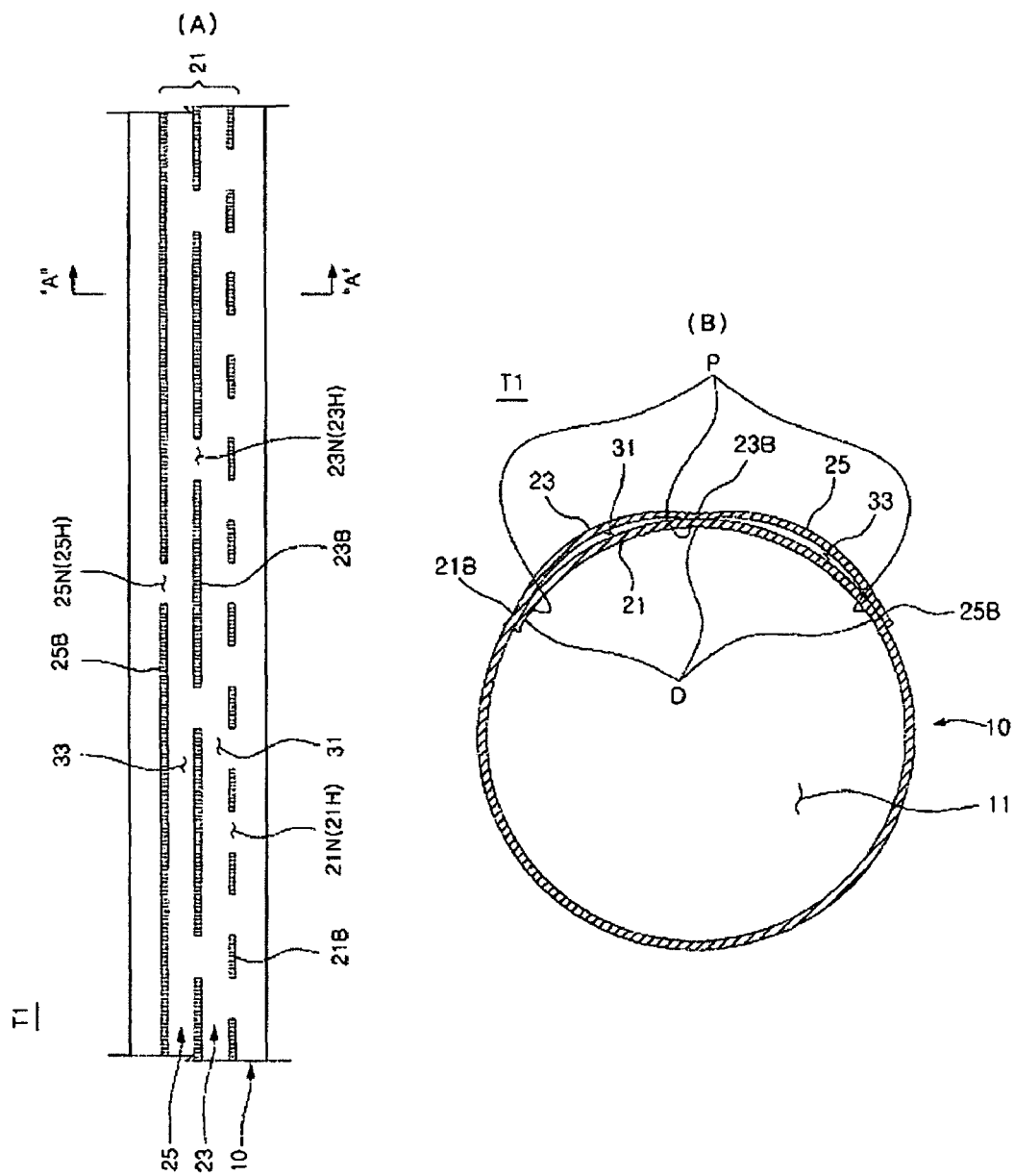

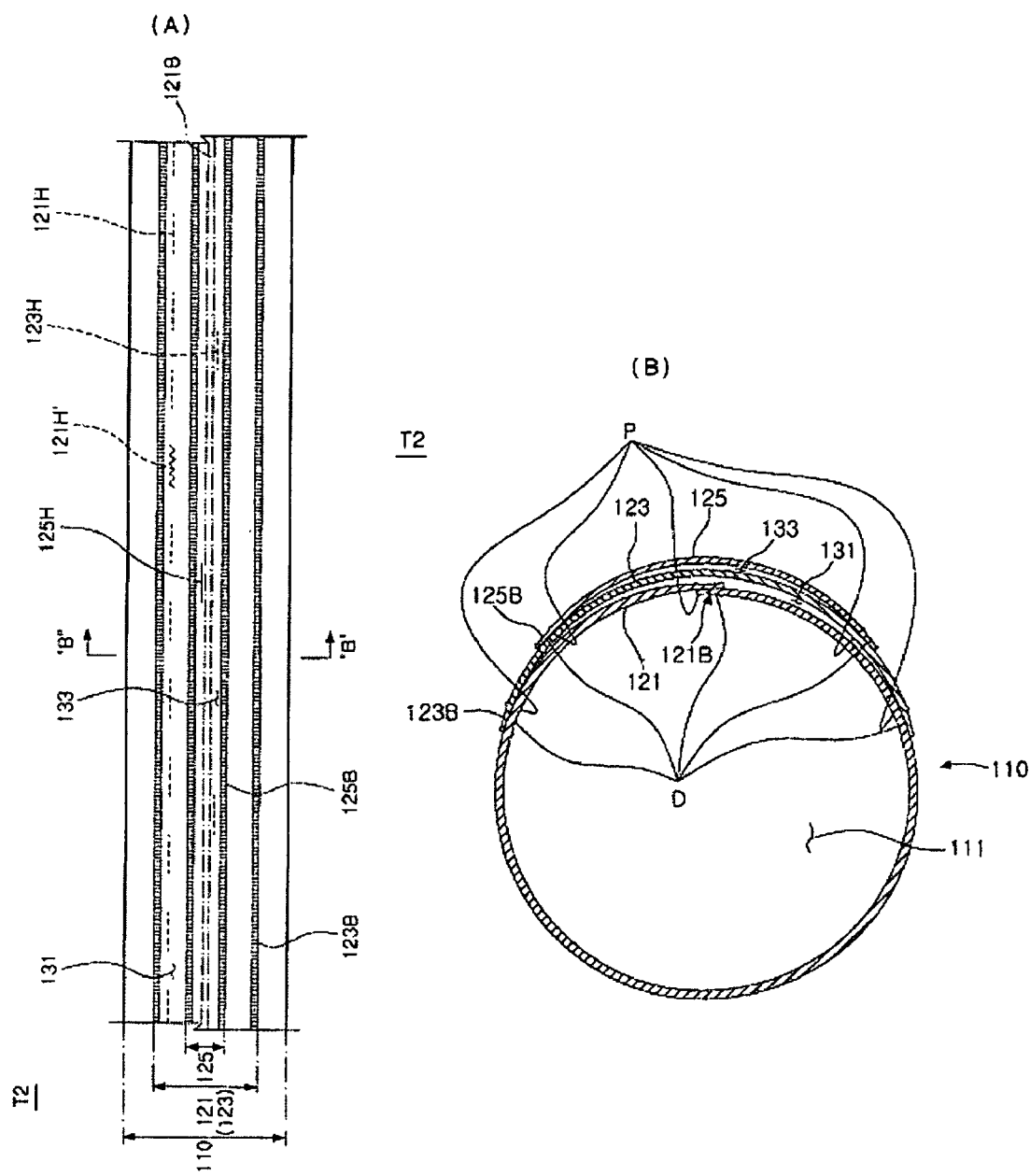
[Figure 2]

PRESSURE-COMPENSATION DRIP TAPE

TECHNICAL FIELD

The present invention relates to a drip tape, which is used in drip irrigation to continuously and evenly supply a small amount of water to various kinds of plants, such as crops or garden plants, to promote the growth of the plants.

Particularly, the present invention provides a drip tube such that drip irrigation is achieved along the whole drip tape without a pressure-reducing liner (which is continuously formed), a discontinuous pressure-reducing emitter (which is regularly arranged), and a repeatedly bent passage (which is referred to generally as 'a labyrinthine method').

To achieve the above-mentioned purpose, the present invention is comprised of overlapping sheets, which define pressure-reducing passages, communicating with each other through discharge holes.

Furthermore, the present invention is comprised of a main passage, which is defined by an outer shell and an innermost overlapping sheet, being expanded to form a cylinder shape by the water supplied from the water source.

When the overlapping sheets are compressed, the volume of the pressure-reducing passages, which is defined between the overlapping sheets, is reduced. As a result, the extent to which discharge holes open is reduced, and thereby the pressure of the dripping water is reduced.

According to the present invention, the drip tape has a simple structure. As it were, the overlapping sheets are formed merely by overlapping films and the discharge holes are formed on the overlapping sheets. Accordingly, the drip tape of the present invention can excellently reduce the pressure of the dripping water.

Therefore, the present invention can reduce a manufacturing cost, which is one of the important factors in commercial inventions, and can provide an inexpensive drip tape that ensures satisfactory performance by controlling the discharge pressure of the water using the overlapping sheets.

Generally, plants are able to use water only in a limited depth around which the rootlets thereof are distributed.

Therefore, in the cultivation of various kinds of crops or garden plants, for reasons of economy, water should drain to keep an effective depth of water.

For this, drip tapes, which ensure even water supply (in other words, uniformity of water supply), have been used. In such a drip tape, the most important object is to ensure the uniform discharge of water along the whole drip tape of which length is several hundred meters.

For reference, in the irrigation, the term of a 'hose' means a product having a relatively hard outer shell. On the other hand, the term of a 'tape' means a product which can be easily rolled up into a roll shape.

However, the present invention is not limited by the senses of a 'hose' and 'tape,' which are separately used in the irrigational industry.

Furthermore, the term of a 'tube' will include the terms of a 'hose' and 'tape' in a broad sense, which can be acceptable for the description.

BACKGROUND ART

A conventional drip tape has a path along which water flows and the pressure-reducing means including an uneven surface part .

Typically, the drip tapes using the uneven surface part are classified into a tape provided with a pressure-reducing liner formed continuously, and a tape provided with pressure-reducing emitters which are arranged discontinuously (but are regularly arranged at predetermined intervals).

A representative example of the former was proposed in Korean Utility Model Registration No. 0411174 (Mar. 6, 2006), which was filed by the applicant of the present invention and entitled [HOSE USED FOR CROP CULTIVATION].

A representative example of the latter was proposed in Korean Patent Registration No. 0569225 (Apr. 3, 2006), which was filed by the applicant 'Jae-yong So' and entitled [PRESSURE-REDUCING HOSE].

As for a conventional drip hose having another structure, the hose has a pressure-reducing means which has repeatedly bent passages like the labyrinthine. A representative example of the drip hose using pressure-reducing means formed as the labyrinthine was proposed in Korean Patent Registration No. 0204261 (Mar. 26, 1999), which was filed by Rain Bird Sprinkler Manufacturing Corporation and entitled [DRIP IRRIGATION TUBE].

However, the gist of the drip tapes using the pressure-reducing means having the uneven surface or labyrinthine structure differs from that of the present invention.

Meanwhile, conventional techniques have tubes which are manufactured by heat-bonding overlapping films in the same manner as the present invention. The drip tubes were proposed in Korean Utility Model Registration No. 0172991 (Dec. 15, 1999), which was filed by the applicant 'Kyu-Sub Choi' and entitled [FILM HOSE FOR CROP CULTIVATION], in Korean Utility Model Registration No. 0306616 (Feb. 25, 2003), which was filed by the applicant 'Ki-Seok Seo' and entitled [DRIP TYPE WATER SUPPLY TUBE], and in Korean Utility Model Registration No. 0332247 (Oct. 27, 2003), which was filed by the applicant 'Ho-Gyoun Kim' and entitled [WATER SUPPLY HOSE FOR FARMING].

However, the conventional techniques proposed in the above Utility Models have a little pressure-reducing effect. In the conventional techniques, water is forcefully discharged from the tube so that a large amount of water does not permeate into the ground but flows along the ground surface, thereby causing soil erosion. Furthermore, uniform irrigation is not ensured along the entire tube.

According to a conventional technique, a hose has overlapping parts of films and protrusions maintaining the gap which are defined by the overlapping parts of the films in an outer water passage. Moreover, the gap is arranged in the longitudinal direction of the hose in order to discharge water evenly from the hose. The conventional tube was proposed in Korean Utility Model Registration No. 0401878 (Nov. 16, 2005), which was filed by the applicant 'Gak-su Kwon' and entitled [DRIP HOSE].

However, this Utility Model has nothing to do with dripping water evenly and continuously for the growth of plants.

In the technical field for drip tapes, there are similarities between the above-mentioned conventional techniques and the present invention. However, the drip tape of the present invention can control the pressure without using a pressure-reducing means such as an uneven surface or labyrinthine structure.

The drip tape of the present invention has overlapping sheets formed by overlapping parts of a film (or films). The overlapping sheets of the drip tape are expanded by water pressure. As a result, the pressure of the discharged water is reduced. These characteristics of the present invention are markedly different from those of the hoses of the conventional techniques.

DISCLOSURE

[Technical Problem]

Accordingly, the present invention provides a pressure-compensation drip tape which can be excellent in controlling the pressure as compared with conventional techniques. Moreover, the manufacturing cost of the present invention is remarkably low as compared with conventional techniques.

To achieve the above purpose, the present invention has a main passage, which is mostly defined by an outer shell, such that most of the water for irrigation flows through the main passage.

Furthermore, the present invention includes at least double-layered overlapping sheets which are connected to the outer shell. The overlapping sheets have an innermost overlapping sheet which surrounds a portion of the main passage. Moreover, the innermost overlapping sheet is expanded by water flowing through the main passage.

In addition, pressure-reducing passages, which communicate with each other through corresponding discharge holes, are defined between the overlapping sheets.

Using this construction, the object of the present invention is to provide a drip tape such that at least the innermost overlapping sheet is expanded outwards by the water flowing through the main passage to minimize the extent to which the discharge holes open, thereby primarily reducing the pressure of the water.

Another object of the present invention is to provide a pressure-compensation drip tape, which has an adhering prevention means for solving the problem that the remaining water acts as an adhesive. According to conventional techniques, after supplying water to the tape and stopping water supply, it is almost impossible to resupply water because the remaining water in the tape acts as an adhesive as water is used as an adhesive in window tinting.

In the case where the main passage and the pressure-reducing passages are formed by overlapping films and heat-bonding a portion of the overlapping parts of the films, of the heat-bonded parts become thinner than the original films, thereby forming depressions. Also, the circumferences of depressions become slightly thicker than the original films, thereby forming protrusions.

The depressions and the protrusions form the adhering prevention means, serving to prevent the films from being adhered to each other.

Another object of the present invention is to provide a pressure-compensation drip tape having the discharge holes which are formed in the border between pressure-reducing passages and in the border between one of the pressure-reducing passages and the outside. The discharge holes are disposed at positions offset from each other, so that water which passes through the discharge holes collides with the heat-bonded parts by which the outer shell and the corresponding overlapping sheet are bonded to each other or the overlapping sheets are bonded to each other. Thus, the flow rate of the water is reduced by the collision rather than as water directly flows, and accordingly the pressure of the water is secondarily reduced. Further, the sum of the flow rates of water that passes through the discharge holes formed in the border between the main passage and the inside pressure-reducing passage is greater than the sum of the flow rates of water that passes through the discharge holes formed in the border between the inside pressure-reducing passage and the outside pressure-reducing passage, or the sum of the flow rates of water that passes through the last discharge holes which water drips outside the drip tape through, thereby tertiarily reducing the pressure of the water.

Therefore, the present invention can more reliably control pressure (that is, reduce pressure), thereby ensuring satisfactory drip irrigation.

Another object of the present invention is to provide the method of manufacturing the pressure-compensation drip tape. By the method, discontinuous heat-bonded parts are formed in the overlapping parts of one film in the longitudinal direction at predetermined intervals. Then, the main passage and the pressure-reducing passages are formed by overlapping and partially heat-bonding parts of a single film into a cylinder shape. In addition, the discharge holes are formed by parts of the film other than the heat-bonded parts.

Furthermore, the method of manufacturing the drip tube is provided using several films. In detail, the main passage is defined by overlapping parts of a first film having the largest width and by continuously heat-bonding the overlapping parts of the first film. Moreover, a second film having the second largest width is attached to the first film by continuous heat-bonding, and a third film is attached to the second film. The discharge holes are previously formed in the films by incising or punching parts of the films which overlap each other.

[Technical Solution]

In order to achieve the above objects, the present invention provides a pressure-compensation drip tape, comprising: an outer shell; a plurality of overlapping sheets having at least a double-layered structure, each of the plurality of overlapping sheets being expandable depending on an increase in water pressure; a main passage, which most of the water supplied from a water source flows through, defined by the outer shell and an innermost overlapping sheet of the plurality of overlapping sheets; a plurality of pressure-reducing passages defined between the overlapping sheets; and a plurality of discharge holes, which the water flows sequentially from the main passage to the outside through, formed in each of the overlapping sheets.

Preferably, in the pressure-compensation drip tape of the present invention, to complement the pressure-reducing function in such that the extent to which the discharge holes open is minimized when water pressure is applied to the innermost overlapping sheet, the discharge holes may be disposed at positions that are offset from each other. The sum of flow rates of water that passes through the discharge holes formed in the border between the main passage and the inside pressure-reducing passage may be greater than the sum of flow rates of water that passes through the discharge holes formed in the border between the inside pressure-reducing passage and the outside pressure-reducing passage, or may be greater than the sum of flow rates of water that passes through the last discharge holes which the water drips outside the drip tape through.

Furthermore, to solve a problem such that the remaining water acts as an adhesive in a similar way to a window tinting film after almost all of the water in the tape is discharged, the pressure-compensation drip tape according to the present invention includes an adhering prevention means.

Particularly, in the case where the main passage and the overlapping sheets are formed by the heat-bonding method, the adhering prevention means is achieved by bonded parts of the outer shell and the overlapping sheets which are bonded to each other by heating.

[Advantageous Effects]

As described above, the pressure-compensation drip tape of the present invention comprises a main passage which is mostly defined by an outer shell and most of the water for irrigation flows through. Further, the drip tape comprises at least double-layered overlapping sheets. Among the overlapping sheets, an innermost overlapping sheet, which partially surrounds the main passage, are connected to the outer shell. Moreover, the innermost overlapping sheet is expanded by water flowing through the main passage. In addition, the drip tape comprises pressure-reducing passages which communicate with each other through corresponding discharge holes, and the pressure-reducing passages are defined between the overlapping sheets. Therefore, the innermost overlapping sheet is expanded outwards at least by water flowing through the main passage. Accordingly, the pressure of the water is primarily reduced.

Furthermore, to solve a problem such that the supply of water may become impossible because the remaining water acts as an adhesive in a similar way to a window tinting film after almost all of the water in the tape is discharged, the main passage and the pressure-reducing passages are formed by overlapping parts of films and by partially heat-bonding the overlapping parts of the films. Each of the heat-bonded parts becomes thinner than the original films, thereby forming a depression. Also, the circumference of each depression becomes slightly thicker than the original films, thereby forming a protrusion. The depressions and the protrusions are implemented as an adhering-prevention means which prevent the main passage and the pressure-reducing passages from adhering to each other.

In addition, the discharge holes according to the present invention, which are formed in the border between the main passage and one pressure-reducing passage, the border between the pressure-reducing passages, and the border between another pressure-reducing passage, are disposed at positions that are offset from each other. Therefore, water which passes through the discharge holes collides with the heat-bonded parts by which the other shell and the corresponding overlapping sheet are bonded to each other or the overlapping sheets are bonded to each other. As a result, the flow rate is reduced rather than the flow rate of water directly flowing towards the subsequent discharge hole, thereby the pressure of the water being secondarily reduced. Moreover, the sum of flow rates of water that passes through the discharge holes formed in the border between the main passage and the inside pressure-reducing passage is greater than the sum of flow rates of water that passes through the discharge holes formed in the border between the inside pressure-reducing passage and the outside pressure-reducing passage, or the sum of flow rates of water that passes through the last discharge holes through which water drips outside the drip tape, thereby the pressure of the water being reduced tertiarily. Therefore, the present invention can more reliably compensate pressure (that is, reduce pressure)

As such, the present invention can implement a satisfactory pressure-reducing owing to the above-mentioned characteristics of the drip tape where the overlapping sheets are formed merely by overlapping films and the discharge holes are formed in the overlapping sheets. Moreover, the present invention can achieve the aim of minimizing manufacturing costs, which is one of the important factors in a commercial aspect. The present invention can provide an inexpensive drip tape which ensures satisfactory drip adapting the structure of the discharge pressure being controlled by the overlapping sheets.

DESCRIPTION OF DRAWINGS

FIG. 1A is a schematic plan view of a pressure-compensation drip tape according to a first embodiment of the present invention.

FIG. 1B is a schematic cross-sectional view of the pressure-compensation drip tape according to the first embodiment of the present invention.

FIG. 2A is a schematic plan view of a pressure-compensation drip tape according to a second embodiment of the present invention.

FIG. 2B is a schematic cross-sectional view of the pressure-compensation drip tape according to the second embodiment of the present invention.

BEST MODE

Hereinafter, the present invention will be described in detail with reference to the attached drawings.

FIG. 1A is a schematic plan view of a pressure-compensation drip tape according to a first embodiment of the present invention, and FIG. 1B is a schematic cross-sectional view taken along the line A-A of FIG. 1A.

FIG. 2A is a schematic plan view of a pressure-compensation drip tape according to a second embodiment of the present invention, and FIG. 2B is a schematic cross-sectional view taken along the line B-B of FIG. 2A.

The same reference numerals throughout the drawings denote elements having the same function. The same reference numerals for the second digit and the first digit denote elements having the same function, too. Moreover, the same reference numerals for the second digit, the first digit, and an alphabet character denote elements having the same function. If not specifically mentioned otherwise, the elements denoted by the reference numerals are to be assumed to comply with the above-mentioned reference scheme.

Furthermore, in the description of the pressure-compensation drip tape according to the present invention, the direction will be defined as follows with reference to FIGS. 1A and 1B for the convenience of description.

In a relative respect, a pressure-reducing passage through which water discharged from the main passage passes earlier is referred to as an inside pressure-reducing passage, and a pressure-reducing passage through which the water discharged from the main passage passes later is referred to as an outside pressure-reducing passage.

With regard to overlapping sheets, the term of 'layer' means a state in which the innermost overlapping sheet 21 and outer sheets 23 and 25 overlap each other.

With regard to pressure-reducing passages 31, 33, 131, and 133 and discharge holes 21H, 23H, 25H, 121H, 123H, and 125H in FIGS. 1A through 2B, the terms of 'first', 'second', and 'third' are determined according to the sequence in which water flows while water is supplied from a water source to the main passage 11 and 111 and drips outside the tape T1 and T2.

Meanwhile, in FIGS. 2 and 4, the cross-sectional area of each of the pressure-reducing passages 31, 33, 131, and 133 of the drip tapes T1 and T2, which are defined by the corresponding overlapping sheets 21, 23, 25, 121, 123, and 125, is exaggerated to more clearly and conveniently illustrate the present invention. In actuality, the width of the overlapping portion between the overlapping sheets is almost constant, and the cross-sectional area of each pressure-reducing passage is very small.

Referring to FIGS. 1A and 1B, the drip tape T1 according to the first embodiment of the present invention comprises an outer shell 10 and double-layered overlapping sheets, which include an innermost overlapping sheet 21 connected with the outer shell 10. Furthermore, the drip tape T1 has therein a main passage 11, which is defined by the outer shell 10 and the innermost overlapping sheet 21, pressure-reducing passages 31 and 33, which are defined between the overlapping sheets, and discharge holes 21H, 23H and 25H, which communicate the main passage with the pressure-reducing passages.

The terms of an 'outer shell' and 'overlapping sheet' are defined not by physically, but by functionally.

The drip tape T1 of FIGS. 1A and 1B is manufactured by consecutively overlapping and heat-bonding parts of a synthetic resin film having a predetermined width.

As described above, a produced tube is designated to the term of a 'tape' or 'hose' depending on the thickness and hardness of the outer shell 10.

With regard to the kind, properties and thickness of the film, the important point is that the overlapping sheets (in particular, the innermost overlapping sheet 21), which defines the main passage 11, is required to be expanded by the pressure of the water which passes through the main passage 11, and to be able to compress the discharge holes 21H, 23H and 25H for minimizing the extent to which the discharge holes 21H, 23H and 25H open.

In the specification of the present invention, the terms of a 'sheet' and 'film' are not clearly distinguished scientifically.

Typically, a film is used as a material to produce a drip tape.

The part of the drip tape that defines the pressure-reducing passage is designated to the term of an 'overlapping sheet'.

Almost all of the water that is supplied from the water source flows through the main passage 11. Typically, a tap is used as the water source. The tap may be connected to one end of the drip tape, having a length of several tens or several hundreds of meters, (in this case, the other end of the drip tape is closed). Alternatively, the tap may be connected to the opposite ends of the drip tape. Furthermore, the overlapping sheets 21, 23, and 25 form at least a double-layered structure, and two pressure-reducing passages 31 and 33 are defined by overlapping sheets, thereby the pressure of the water being reduced when the water passes through the discharge holes 21H, 23H and 25H.

Therefore, in the drip tape T1 having the structure illustrated in FIGS. 1A and 1B, it is sufficient that only the innermost sheet 21 has properties and thickness appropriate for expansion or contraction depending on the pressure of water, or the outer sheets 23 and 25 and the outer shell 10 may be hard so that the tube has the properties of a hose.

In the drip tape T2 having the structure illustrated in FIGS. 2A and 2B, however, at least the innermost sheet 121 and a subsequent sheet 123 are required to have properties and thickness appropriate for expansion or contraction depending on the pressure of water because the pressure-reducing passages 131 and 133 are defined as a layered structure.

In a broad sense, the outer shell and the overlapping sheets may be made of films having different properties such as hardness.

The drip tape T1 of FIGS. 1A and 1B is manufactured by consecutively overlapping and heat-bonding parts of a synthetic resin film (for example, low-density polyethylene; LDPE), having a predetermined width and length (for example, 200 m).

Heat-bonded parts 21B, 23B, and 25B of the drip tape T1, which are formed through the heat-bonding process, are discontinuous so as to form the discharge holes 21H, 23H, and 25H. Furthermore, each of heat-bonded parts 21B, 23B, and 25B is formed along a linear line in the longitudinal direction of the drip tape T1. This is because the regular and linear structure facilitates the manufacturing process. However, the present invention is not limited by the shapes, arrangement, or dimensions of the heat-bonded parts.

The discharge holes 21H, 23H, and 25H are formed in the border between the main passage 11 and one pressure-reducing passage, in the border between the pressure-reducing passages 31 and 33, and in the border between the other pressure-reducing passage and the outside and allow water supplied from the water source to drip outside.

In detail, in the case where the overlapping sheets are partially bonded to each other by heating, the discharge holes 21H, 23H, and 25H are formed on unbonded parts 21N, 23N and 25N in which the overlapping sheets are not bonded to each other.

The sizes of the discharge holes, intervals therebetween, and the flow rate of water passing through the discharge holes may be adjusted as necessary (for example, according to desired growth conditions for the kind of a crop).

Furthermore, the first discharge hole 21H, which allows the main passage 11 to communicate with the first pressure-reducing passage 31, the second discharge hole 23H, which allows the first pressure-reducing passage 31 to communicate with the second pressure-reducing passage 33, and the third discharge hole 25H, through which water drips outside the drip tape T1 from the second pressure-reducing passage 33, are disposed at positions that are offset from each other.

Due to this arrangement of the discharge holes, when the main passage is expanded into a cylinder shape, the overlapping sheets are compressed such that the volumes of the pressure-reducing passages which are defined between the overlapping sheets are minimized. Accordingly, a primary pressure-compensating effect is achieved.

In addition, water that passes through each of the discharge hole 21H and 23H collides with the heat-bonded parts 21B, 23B, and 25B, by which the outer shell 10 and the overlapping sheet 21, 23, 25 are bonded to each other, and thus the flow rate of water is reduced rather than as water directly flows towards the subsequent discharge hole to ensure a secondary pressure-reducing function.

Preferably, in the drip tape T1 of the present invention, the sum of flow rates of water that passes through the discharge holes formed in the border between the main passage and the inside pressure-reducing passage is greater than the sum of flow rates of water that passes through the discharge holes formed in the border between the inside pressure-reducing passage and the outside pressure-reducing passage, or is greater than the sum of flow rates of water that passes through the last discharge holes, through which water drips outside the drip tape T1, thus a tertiary pressure-compensating function being ensured.

In other words, as illustrated in FIG. 1A, the discharge holes have the following relations: the number of first discharge holes 21H>the number of second discharge holes 23H>the number of third discharge holes 25H.

Here, each of the discharge holes 21H, 23H, and 25H has the same size.

Therefore, the sum of flow rates of water that passes through the discharge holes in the border between the main passage and the inside pressure-reducing passage is greater than the sum of the flow rates of water that passes through the discharge holes in the border between the inside pressure-reducing passage and the outside pressure-reducing passage.

Although not shown in the drawings, if an outside discharge hole is larger than an inside discharge hole with respect to the size of each discharge hole of the pressure-reducing passages and each final discharge hole, an additional pressure-reducing effect can be expected.

As described above, in the pressure-compensation drip tape T1 shown in FIGS. 1A and 1B, when water is supplied from the water source into the main passage 11, the innermost overlapping sheet 21 expands along with the outer shell 10 to become closer to the outer overlapping sheets 23 and 25. Thus, the principal pressure compensation is ensured.

Additionally, due to the arrangement of the discharge holes, which are offset from each other, water that passes through each discharge hole collides with the corresponding heat-bonded part 21B, 23B, and 25B, and the flow rates of water that passes through the discharge holes 21H, 23H and 25H of the pressure-reducing passages 31 and 33 are reduced as the water flows. Thus, secondary and tertiary pressure-reducing effects are ensured.

As a result, the drip tape according to the present invention can more reliably conduct the pressure-reducing operation, as compared with the conventional liner or emitter having the pressure-reducing means using an uneven-surfaced (凹凸) or labyrinthine passage, so that even irrigation can be achieved along the entire drip tape.

Furthermore, unlike the pressure-reducing passage (the uneven-surfaced or labyrinthine passage) of the conventional pressure-reducing tape, the pressure-reducing passages in the drip tape according to the present invention each has a relatively large volume and form a single duct line (particularly, a linear duct line) over all.

Therefore, the present invention can markedly reduce or prevent a clogging phenomenon, in which the pressure-reducing passages are clogged by foreign substances, such as clay, soil, clods of iron powder, nutrient solutions, etc., by an increase in viscosity due to the foreign substances, or by scales formed in the passages over longtime use.

Moreover, the conventional pressure-reducing hose has each discharge hole required to be formed as small as possible to ensure the pressure-reducing effect, whereas the drip tape of the present invention has each discharge hole which may not be minimized in size to ensure the pressure-reducing effect, because each discharge hole can have a relatively large size. Thus, a clogging problem of the discharge holes is solved.

In addition, in the conventional drip tapes, after supplying water to the tape and stopping the water supply, the remaining water in the tape acts as an adhesive as an adhesive like window tinting where a film is attached to a window. Thus, there is a problem in that it may become impossible to supply water. However, the drip tape of the present invention can prevent such a problem. That is, in the present invention, as shown in FIG. 1B, depressions D which are formed by the formation of the heat-bonded parts 21B, 23B, and 25B, and protrusions P which are formed around the depressions D serve as an adhering prevention means for preventing the films, which form the main passage and the pressure-reducing passages, from being adhered to each other.

In detail, in the drip tape T1 according to the present invention, when the main passage and the pressure-reducing passages are formed by overlapping parts of films and by partially heat-bonding the overlapping parts of the films, a part of each heat-bonded part 21B, 23B, and 25B becomes thinner than the original films, thus forming the depression D, and the circumference of each depression D becomes slightly thicker than the original films, thus forming the protrusion P.

The formation of the depression and the protrusion of the heat-bonded part is due to the difference in a blow-up ratio between a transverse direction (TD) and a machine direction (MD) when synthetic films are bonded to each other, and due to the difference in a contraction ratio (an MD contraction ratio>a TD contraction ratio) at a frost line where the heated part in a molten state is solidified.

As necessary, the adhering prevention means may be achieved by separate continuous or discontinuous embossments, which are formed by heat-pressing parts of the films regardless of the process of bonding the films to each other.

Alternatively, the adhering prevention means may be achieved by fine uneven surfaces or wrinkles (in a range within which they do not affect the product quality of the drip tape), which are formed in the heat-bonded parts when the overlapping sheets are bonded to each other by heating.

As a further alternative, the adhering prevention means may be achieved by threads, which are placed in the main passage 11 and the pressure-reducing passages 31 and 33 before the process of bonding the films to each other is conducted. In this case, it is preferable that a thread (for example, a fishing line) which does not absorb water be used.

Meanwhile, FIGS. 2A and 2B illustrate a drip tape T2 having a structure that is different from that of FIGS. 1A and 1B.

Referring to FIGS. 2A and 2B, a main passage 111 is defined by an outer shell 110 and an innermost overlapping sheet 121. The outer shell 110 and the overlapping sheet 121 are formed by continuously heat-bonding opposite edges of a film having a predetermined width to each other. Furthermore, a second overlapping sheet 123 which defines a first pressure-reducing passage 131 along with the first overlapping sheet 121 is also attached to the first overlapping sheet 121 by heat-bonding.

A third overlapping sheet 125 for defining a second pressure-reducing passage 133 is also attached to the second overlapping sheet 123 by heat-bonding.

Discharge holes 121H, 123H, and 125H through which the main passage 111 and the first and second pressure-reducing passages 131 and 133 communicate with each other are formed in the corresponding overlapping sheets by incising or punching parts of the overlapping sheets in advance (that is, before the overlapping sheets are attached to each other by heat-bonding).

The discharge holes 121H, 123H, and 125H are disposed at positions that are offset from each other.

The discharge holes have the following relation: the number of first discharge holes 121H>the number of second discharge holes 123H>the number of third discharge holes 125H. Each of the discharge holes 121H, 123H, and 125H has the same size. Thus, the flow rate of water through the discharge holes is reduced as water flows along the flow path.

For reference, each discharge hole of the pressure-reducing passages may have a linear shape or, alternatively, it may have a gear tooth shape (or some other nonlinear shapes), like the discharge hole 121H' shown in FIG. 2B, in order to enhance the effect of preventing the discharge holes from clogging.

Furthermore, in the case where the discharge hole is formed to have the shape of '⊂⊃' as one example of the nonlinear shape such that a piece having a tongue shape is provided in the discharge hole, it is expected to more reliably prevent the discharge hole from being clogged.

As described above, in the drip tape T2 of FIGS. 2A and 2B, the pressure-reducing passages 131 and 133 are arranged in a stratified structure, and at least the innermost sheet 121 and the subsequent sheet 123 have appropriate properties and thickness such that they are expandable when water pressure is applied thereto.

Therefore, the overlapping sheets 121 and 123 expand and contract the discharge holes 121H, 123H, and 125H when water pressure is applied thereto, thus minimizing the extent to which the discharge holes open, to realize the pressure-reducing effect.

Furthermore, with regard to an adhering prevention means for preventing parts of the outer shell or the corresponding sheets from being adhered to each other, as shown in FIG. 2B, depressions D and protrusions P which are formed by heat-bonded parts 121B, 123B, and 125B (in FIG. 2A, the heat-bonded part 121B is designated by a dot-dashed line) are provided in the main passage and between the overlapping sheets.

Additionally, the heat-bonded part 121B of the outer shell 110 and the first overlapping sheet 121, which define the main passage 111, serve to prevent parts of the inner surface of the main passage 111 from adhering to each other.

In the drip tape T2 shown in FIGS. 2A and 2B, when water is supplied from the water source into the main passage 111, the first overlapping sheet 121 expands along with the outer shell 110 to become closer to the second overlapping sheet 123.

Furthermore, as the first pressure-reducing passage 131 is filled with water, the second overlapping sheet 123 also expands to be closer to the third overlapping sheet 125. Therefore, the principal pressure-compensating effect is exhibited.

Additionally, due to the arrangement of the discharge holes, which are offset from each other, water that passes through the discharge holes collides with the second or third overlapping sheet 123 or 125, and the flow rates of water that passes through the discharge holes 121H, 123H, and 125H of the pressure-reducing passages 131 and 133, are reduced as the water flows. Thus, the secondary and tertiary pressure-reducing effects are exhibited. As a result, the entire drip tape of the present invention can more reliably conduct the drip operation of water supply.

The foregoing description has been made with two pressure-reducing passages as an illustrative example, but the number of pressure-reducing passages is not limited to two. More pressure-reducing passages may be provided in the present invention.

Also, although the typical principle and well-known techniques pertaining to the drip tube (hose or tape) have been omitted in the description, those skilled in the art will easily infer these.

Although the preferred embodiments of the present invention have been disclosed for illustrative purpose, those skilled in the art will appreciate that various modifications, additions and substitutions are possible, without departing from the sprit and scope of the present invention as disclosed in the accompanying claims.

The invention claimed is:

1. A pressure-compensation drip tape, comprising:
   an outer shell;
   a plurality of overlapping sheets having at least a double-layered structure, each of the plurality of overlapping sheets being expandable depending on an increase in water pressure;
   a main passage, which most of the water supplied from a water source flow through, defined by the outer shell and an innermost overlapping sheet of the plurality of overlapping sheets;
   a plurality of pressure-reducing passages defined between the overlapping sheets; and
   a plurality of discharge holes, which the water flows sequentially from the main passage to the outside through, formed in the border between the main passage and one pressure-reducing passage, in the border between the pressure-reducing passages, and in the border between the outmost pressure-reducing passage and the outside,
   wherein the discharge holes are disposed at positions that are offset from each other, and
   wherein the discharge holes are unbonded parts between the overlapping sheets.

2. The pressure-compensation drip tape according to claim 1, wherein a sum of flow rates of water that passes through discharge holes formed in the border between pressure-reducing passages disposed inward is greater than a sum of flow rates of water that passes through discharge holes formed in the border between pressure-reducing passages disposed outward, or is greater than a sum of flow rates of water that passes through the last discharge holes for dripping water outside.

3. The pressure-compensation drip tape according to claim 2, wherein the discharge holes in the border between pressure-reducing passages disposed inward, and the border between pressure-reducing passages disposed outward and the last discharge holes have a same size.

4. The pressure-compensation drip tape according to claim 2, wherein the discharge holes in the border between pressure-reducing passages disposed inward, and the border between pressure-reducing passages disposed outward and the last discharge holes are increased in size from inside to outside.

5. The pressure-compensation drip tape according to claim 2, further comprising:
   means for preventing adhesion provided in the main passage and between the overlapping sheets to prevent parts of the outer shell or the overlapping sheets from adhering to each other, wherein, in a case where the main passage and the overlapping sheets are partially bonded by heat-bonding to each other to form heat bonded parts, the means for preventing adhesion comprises depressions and protrusions around the depressions formed by the formation of the heat bonded parts.

6. The pressure-compensation drip tape according to claim 5, wherein a thickness of the depressions is less than a thickness of the overlapping sheets and a thickness of the protrusions is greater than the thickness of the overlapping sheets.

7. The pressure-compensation drip tape according to claim 1, wherein the discharge holes in the border between pressure-reducing passages disposed inward, and the border between pressure-reducing passages disposed outward and the last discharge holes have a same size.

8. The pressure-compensation drip tape according to claim 1, wherein the discharge holes in the border between pressure-reducing passages disposed inward, and the border between pressure-reducing passages disposed outward and the last discharge holes are increased in size from inside to outside.

9. The pressure-compensation drip tape according to claim 1, wherein the overlapping sheets are partially bonded to each other by heating.

10. The pressure-compensation drip tape according to claim 1, further comprising:
   means for preventing adhesion provided in the main passage and between the overlapping sheets to prevent parts of the outer shell or the overlapping sheets from adhering to each other wherein, in a case where the main passage and the overlapping sheets are partially bonded to each other by heat-bonding to form heat bonded parts, the means for preventing adhesion comprises depressions and protrusions around the depressions formed by the formation of the heat bonded parts.

11. The pressure-compensation drip tape according to claim 1 further comprising:
   means for preventing adhesion provided in the main passage and between the overlapping sheets to prevent parts of the outer shell or the overlapping sheets from adhering to each other, the means for preventing adhesion comprising threads which are placed in the main passage and the pressure-reducing passages.

* * * * *